United States Patent [19]

Töpfl et al.

[11] Patent Number: 4,894,183
[45] Date of Patent: Jan. 16, 1990

[54] COMPOSITION AND USE THEREOF AS DYEING OR TEXTILE AUXILIARY

[75] Inventors: Rosemarie Töpfl, Dornach; Heinz Abel, Reinach, both of Switzerland

[73] Assignee: Ciba-Geiby Corporation, Ardsley, N.Y.

[21] Appl. No.: 147,093

[22] Filed: Jan. 20, 1988

Related U.S. Application Data

[63] Continuation of Ser. No. 835,001, Feb. 28, 1986, abandoned.

[30] Foreign Application Priority Data

Mar. 7, 1985 [CH] Switzerland .................. 1024/85

[51] Int. Cl.$^4$ .............................................. B01D 17/00
[52] U.S. Cl. ..................................... 252/358; 252/321
[58] Field of Search ............ 252/358, 321, 356, 174.21

[56] References Cited

U.S. PATENT DOCUMENTS

| | | | |
|---|---|---|---|
| 3,365,402 | 1/1968 | Brenkman et al. | 252/356 |
| 3,419,665 | 12/1968 | Lachampt et al. | 252/356 |
| 3,929,699 | 12/1975 | Bernholz | 252/356 |
| 4,071,468 | 1/1978 | Abel et al. | 252/321 |
| 4,092,266 | 5/1978 | Abel et al. | 252/321 |
| 4,123,378 | 10/1978 | Abel et al. | 252/171 |
| 4,273,554 | 6/1981 | Abel et al. | 8/557 |
| 4,313,733 | 2/1982 | Zurbuchen et al. | 8/582 |
| 4,343,620 | 8/1982 | Abel et al. | 260/410 |

FOREIGN PATENT DOCUMENTS

| | | |
|---|---|---|
| 2302305 | 7/1978 | Fed. Rep. of Germany . |
| 2324718 | 4/1977 | France . |
| 2313958 | 7/1977 | France . |
| 2446350 | 8/1980 | France . |
| 2041388 | 9/1980 | United Kingdom . |

*Primary Examiner*—Mary C. Lee
*Assistant Examiner*—C. K. Scalzo
*Attorney, Agent, or Firm*—Edward McC. Roberts; Meredeth C. Findlay

[57] ABSTRACT

A composition suitable for use as dyeing or textile auxiliary and which comprises a mixture of acid esters of adducts of ethylene oxide and propylene oxide with fatty alcohols having not less than 6 carbon atoms, at least one component of which composition is an acid ester of the formula $$R-O-(CH_2CH_2O)_s-(CH-CHO)_p-X \quad (1)$$
$$\phantom{R-O-(CH_2CH_2O)_s-}|\phantom{-(CH}|$$
$$\phantom{R-O-(CH_2CH_2O)_s-}Z_1\phantom{-(}Z_2$$

wherein s is 3 to 10, p is 5 to 15, R is an aliphatic radical of not less than 6 carbon atoms; one of $Z_1$ and $Z_2$ is methyl and the other is hydrogen, and X is the acid radical of a low molecular aliphatic dicarboxylic acid, in particular maleic acid. This composition is used in particular as low foaming wetting agent and padding auxliary for pretreating or dyeing cellulosic fibre materials.

13 Claims, No Drawings

COMPOSITION AND USE THEREOF AS DYEING OR TEXTILE AUXILIARY

This application is a continuation of application Ser. No. 835,001, filed 2/28/86, now abandoned.

The present invention relates to a novel composition and to the use thereof as dyeing or textile auxiliary and, in particular, as wetting agent.

It has been been found that mixtures of acid esters of fatty alcohol mixed ethers which are obtained in part from ethylene oxide and in part from propylene oxide, at least one of which fatty alcohol mixed ethers has been esterified with an aliphatic dicarboxylic acid, are very suitable for use as dyeing or textile auxiliaries and, in particular, as wetting agents, and cause no troublesome foaming.

Accordingly, the invention relates to a composition which comprises a mixture of acid esters of adducts of ethylene oxide and propylene oxide with fatty alcohols having not less than 6 carbon atoms, at least one component of which composition is an acid ester of the formula

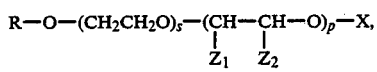

$$R-O-(CH_2CH_2O)_s-(CH(Z_1)-CH(Z_2)-O)_p-X, \quad (1)$$

wherein
s is 3 to 10, p is 5 to 15, preferably s is 4 to 8 and p is 10 to 15,
R is an aliphatic radical of not less than 6 carbon atoms; one of
$Z_1$ and $Z_2$ is methyl and the other is hydrogen and
X is the acid radical of a low molecular aliphatic dicarboxylic acid which preferably contains 3 to 5 carbon atoms, for example maleic acid, succinic acid or sulfosuccinic acid.

Preferred compositions comprise the component of formula (1) and an acid ester of formula

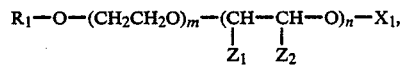

$$R_1-O-(CH_2CH_2O)_m-(CH(Z_1)-CH(Z_2)-O)_n-X_1, \quad (2)$$

wherein
m is 3 to 10, n is 5 to 15, preferably m is 4 to 8 and n is 6 to 12,
$R_1$ is an aliphatic radical of not less than 6 carbon atoms or alkylphenyl containing 4 to 16 carbon atoms in the alkyl moiety; one of
$Z_1$ and $Z_2$ is methyl and the other is hydrogen, and
$X_1$ is the acid radical of an inorganic oxygen-containing acid, for example phosphoric acid or, preferably, sulfuric acid.

The acid radicals $X_1$ and $X_2$ are linked to the oxypropylene part of the molecule through an ester bridge and are preferably in salt form, i.e. for example as alkali metal salt, ammonium salt or amine salt. Examples of such salts are lithium, sodium, potassium, ammonium, trimethylamine, ethanolamine, diethanolamine or triethanolamine salts.

The components of formulae (1) and (2) may be in the form of individual compounds or as mixtures. R and $R_1$ are preferably hydrocarbon radicals of an unsaturated or preferably saturated aliphatic monoalcohol of 6 to 24 carbon atoms. The hydrocarbon radicals can be straight chain or branched. Suitable aliphatic saturated alcohols may be e.g. natural alcohols such as lauryl alcohol, myristyl alcohol, cetyl alcohol, stearyl alcohol, arachidyl alcohol or behenyl alcohol, as well as synthetic alcohols such as oxo-alcohols, in particular 2-ethylbutanol, 2-methylpentanol, hexanol, heptanol, 5-methylheptan-3-ol, octan-2-ol, trimethylnonyl alcohol, decanol, hexadecyl alcohol or alfols. Representative alfols are alfol (8–10), alfol (9–11), alfol (11–13), alfol (10–14), alfol (12–13) or alfol (16–18).

Examples of unsaturated aliphatic alcohols are dodecenyl alcohol, hexadecenyl alcohol or oleyl alcohol.

The alcohol radicals may be present singly or in admixture. The alkyl moiety of an alkylphenyl radical $R_1$ is preferably in the para-position. The alkyl moieties of alkylphenyl may be butyl, hexyl, n-octyl, n-nonyl, p-tert-octyl, p-isononyl, decyl or dodecyl. Preferred alkyl moieties are those containing 8 to 12 carbon atoms, in particular the octyl and nonyl radicals.

R and $R_1$ are each preferably $C_8$–$C_{18}$alkyl. X is preferably the maleic acid radical, and $X_1$ is preferably the sulfuric acid radical.

The acid esters of formula (1) as well as the acid esters of formula (2) are derived from fatty alcohol mixed ethers (block polymers) which advantageously consist of 20 to 55 percent by weight of ethylene oxide units and 45 to 80 percent by weight of propylene oxide units.

The preparation of the anionic block polymers of formulae (1) and (2) is effected by known methods by alternate addition of ethylene oxide and propylene oxide to the cited fatty alcohols as starting compounds, and subsequently esterifying the adducts with the appropriate acid or a functional derivative thereof, e.g. an acid anhydride, acid halide, acid ester or acid amide and, if desired, converting the esters into their salts.

Eligible acid esters deriving from organic acids are those of formula

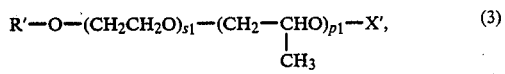

$$R'-O-(CH_2CH_2O)_{s1}-(CH_2-CH(CH_3)O)_{p1}-X', \quad (3)$$

wherein
R' is $C_8$–$C_{18}$alkyl,
X' is the maleic acid radical or the sulfosuccinic acid radical,
$s_1$ is 4 to 8 and
$p_1$ is 10 to 15.

Preferred anionic surfactants containing the radical of an inorganic acid are those of the formula

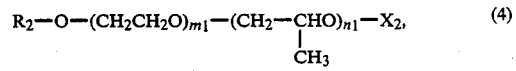

$$R_2-O-(CH_2CH_2O)_{m1}-(CH_2-CH(CH_3)O)_{n1}-X_2, \quad (4)$$

wherein
$R_2$ is $C_8$–$C_{18}$alkyl,
$X_2$ is the sulfuric acid radical (—$SO_3H$),
$m_1$ is 4 to 8 and
$n_1$ is 6 to 12.

The novel compositions can be prepared by simple stirring of the appropriate acid esters and, in particular, of the acid esters of formulae (1) and (2) to give homogeneous clear mixtures which are storage stable at room temperature.

The acid esters of formulae (1) and (2) are normally in the weight ratio of 9:1 to 1:1, preferably of 9:1 to 3:1 and, most preferably, of 5:1 to 3:1.

The novel compositions are suitable for a wide range of utilities in textile application, e.g. pretreatment, dyeing or finishing. In particular, they are used as wetting agents for dyeing natural or synthetic fibre material and, most preferably, for dyeing cellulose fabrics. They do not foam and they enhance dye affinity, thereby promoting the rate of diffusion of the dye in the fibres.

The present invention thus also relates to a process for finishing natural or synthetic fibre material with or without appropriate dyes, said finishing being carried out in the presence of the compositions of this invention.

The amounts in which the compositions of this invention are added to the finishing liquors, e.g. dyebaths or pretreatment liquors, varies preferably from 1 to 20 g, most preferably from 2 to 10 g per liter of liquor, depending on the substrate.

The compositions of the present invention are particularly suitable for the continuous or semi-continuous dyeing of textiles which consist of, or contain, cellulose with substantive dyes or, preferably, with reactive dyes. After they have been impregnated, the cellulose materials can be subjected to a heat treatment to fix the dyes. Dye fixation is preferably carried out by the cold pad-batch method.

Suitable cellulose fibre material is that made of regenerated or, preferably, natural cellulose such as viscose rayon, viscose silk, hemp, jute or, preferably, cotton, as well as blends, e.g. polyamide/cotton blends or, in particular, polyester/cotton blends, the polyester component of which can be dyed with disperse dyes beforehand, concurrently or subsequently.

The textile material can be in any form, e.g. as yarns, hanks, wovens, knits, felted fabrics, but is preferably in the form of textile planar fabrics such as woven fabrics, knitwear or carpeting, which may consist wholly or partly of native, regenerated or modified cellulose. Untreated as well as pretreated goods can be used.

Suitable substantive dyes are the conventional direct dyes, for example those listed under the heading "Direct Dyes" in the Colour Index, 3rd edition (1971), Vol. 2, on pages 2005-2478.

By reactive dyes are meant the conventional dyes which form a chemical bond with cellulose, e.g. those listed under the heading "Reactive Dyes" in the Colour Index, Vol. 3, 3rd. edition (1971), on pages 3391-3560, and in Vol. 6, revised 3rd edition (1975), on pages 6268-6345. Vat dyes may also be used.

The amount of dye in the dye liquor will normally depend on the desired colour strength and is conveniently 0.1 to 80 g/l preferably 2 to 50 g/l.

When using reactive dyes the treatment liquors will normally contain fixing alkalies.

Representative examples of the alkalies employed for fixing the reactive dyes are sodium carbonate, sodium bicarbonate, sodium hydroxide, disodium phosphate, trisodium phosphate, borax, aqueous ammonia, or alkali donors such as sodium trichloroacetate. A very suitable alkali is in particular a mixture of water glass and a 30% aqueous sodium hydroxide solution. The pH of the alkaline dye liquors is generally from 7.5 to 13.2, preferably from 8.5 to 11.5.

The dye liquors are conveniently prepared by dissolving the dye and adding the compositions of this invention and optionally alkali. Depending on the dye employed, the dye liquors can contain conventional additives, e.g. electrolytes such as sodium chloride or sodium sulfate, as well as sequestering agents, reduction inhibitors such as sodium nitrobenzenesulfonate, and also urea, glycerol and/or sodium formate. If desired, thickeners such as alginates, starch ethers or carob bean gum can also be added to the dye liquors. Antifoams such as silicone oils are not necessary.

It has in many cases proved advantageous if the dyebaths contain the compositions of this invention together with homopolymers or copolymers of acrylamide or methacrylamide or graft polymers which are obtainable from an adduct of an alkylene oxide and an at least trihydric alcohol containing 3 to 10 carbon atoms and acrylamide or methacrylamide. The dyebath may also contain mixtures of these polymers.

Preferred graft polymers are those obtained by graft polymerisation of methacrylamide or, preferably, acrylamide to an adduct of 4 to 100 moles, preferably 40 to 80 moles, of propylene oxide with trihydric to hexahydric alkanols of 3 to 6 carbon atoms. These alkanols can be straight chain or branched. Representative examples are glycerol, trimethylolethane, trimethylolpropane, erythritol, pentaerythritol, mannitol or sorbitol.

These graft polymers preferably contain 2.5 to 30% by weight of the alkylene oxide adduct and 70 to 97.5% by weight of grafted methacrylamide or, in particular, acrylamide. More preferably, the amide component is 80 to 97.5% by weight, based on the graft polymer.

Further particulars regarding the nature of these graft polymers, including their preparation, are contained in European patent application EP-A-111 454.

The cellulose-containing textile material is impregnated with the dye liquor by coating, spraying or preferably by padding.

After they have been impregnated, the dyes are fixed by a heat treatment or by the cold pad-batch method.

The thermofixation can be effected by a steaming, hot dwell, thermosol or microwave process.

In the steaming process, the dyes are fixed by subjecting the textile materials impregnated with the dye liquor to a treatment with steam or superheated steam in a steamer, conveniently in the temperature range from 98° to 210° C., preferably from 100° to 180° C. and, most preferably, from 102° to 120° C.

In the hot dwell process, the impregnated goods are stored in the moist state for e.g. 5 to 120 minutes, preferably in the temperature range from 85° to 102° C. In this process, the goods can be preheated to 85°-102° C. by infrared irradiation. The preferred dwell temperature is from 95°-100° C.

Dye fixation by means of the thermosol process can be effected after, or without, an intermediate drying, e.g. at a temperature in the range from 100° to 210° C. It is preferred to carry out the thermosol fixation in the temperature range from 120° C. to 210° C., preferably from 140° to 180° C., and after the goods have been subjected to an intermediate drying at a temperature range of 80° to 120° C. Depending on the temperature, the thermosol fixation can take from 20 seconds to 5 minutes, preferably from 30 to 60 seconds.

The dyes can be thermofixed by means of microwaves. This is conveniently done by rolling up the goods after impregnation with the dye liquor and then exposing them to microwaves in a chamber.

The microwave treatment can take from 2 to 120 minutes; but a treatment from 2 to 15 minutes is preferred. Microwaves are defined as electromagnetic waves (radio waves) in the frequency range from 300 to 100,000 MHz, preferably from 1000 to 30,000 MHz.

Dye fixation by the cold pad-batch method is suitably effected by storing the impregnated goods, preferably folded or rolled up, at room temperature (15°–30° C.), for e.g. 3 to 24 hours. The cold dwell time is, of course, dependent on the dye employed. If desired, the goods can also be stored at slightly elevated temperature (30°–80° C.).

After the dyeing process, the dyed cellulosic material can be given a washing off in conventional manner to remove unfixed dye. This is done by treating the substrate, e.g. in the temperature range from 40° C. to boiling temperature, in a solution which contains soap or a synthetic detergent. Treatment with a fixing agent can subsequently be effected to improve the wetfastness properties.

The process of this invention affords strong dyeings which have a level appearance. In addition, the general fastness properties of the dyed goods, e.g. lightfastness, rubfastness and wetfastness properties, are not adversely affected by the use of the composition of this invention.

In particular, it is possible to obtain excellent penetration of the goods, even on untreated material, with the process of the invention.

In the following Preparatory and Use Examples, percentages are by weight unless otherwise stated. The amounts of dye refer to commercially available, i.e. diluted product, and the amounts of auxiliaries to pure substance. The five-digit Colour Index (C.I.) numbers relate to the 3rd edition of the Colour Index.

PREPARATORY EXAMPLES

A. 98 g of maleic anhydride are fused at 60°–70° C. in a nitrogen atmosphere. Then 1032 g of an adduct of 4 moles of ethylene oxide and 12 moles of propylene oxide with 1 mole of a $C_9$–$C_{11}$ fatty alcohol are added dropwise over 35 minutes, the temperature rising to 75° C. The temperature is raised to 90° C. over 20 minutes and the reaction mixture is stirred for 3½ hours at this temperature. The reaction product is then cooled to room temperature. Yield: 1129 g of the maleic acid hemiester of formula

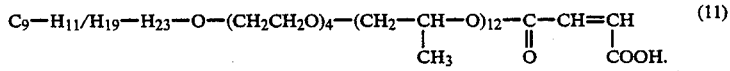

The acid number is 47.8.

134 g of a 30% aqueous sodium hydroxide solution are diluted with 1594 g of water and cooled to 10° C. Then 1129 g of the maleic acid hemiester of formula (11) are added to this dilute solution to give 2858 g of a clear 40% solution of the sodium salt of the maleic acid hemiester of formula (11). The pH is 6.7.

B. 12.75 g of maleic anhydride are fused at 60°–70° C. in a nitrogen atmosphere. Then 134 g of an adduct of 4 moles of ethylene oxide and 12 moles of propylene oxide with 1 mole of a $C_9$–$C_{11}$ fatty alcohol are added dropwise over 30 minutes, the temperature rising to 75° C. The temperature is raised to 90° C. over 10 minutes and the reaction mixture is stirred for 3 hours at this temperature. The reaction product is then cooled. Yield: 146 g of the maleic acid hemiester of formula (11). The acid number is 47.9.

140 g of the above maleic acid hemiester are mixed with 155.5 g of a 40% aqueous solution of sodium bisulfite and the mixture is stirred for 6 hours at 95° C. Upon cooling, two phases form and the excess sodium bisulfite solution (inorganic phase) is separated. The organic phase is evaporated to dryness, affording 153 g of a viscous substance of the formula

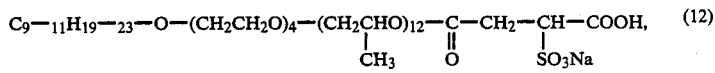

which is diluted with water to give a 50% solution with a pH of 4.9.

C. 16.7 g of maleic anhydride are fused at 60°–70° C. in a nitrogen atmosphere. Then 211.5 g of an adduct of 8 moles of ethylene oxide and 12 moles of propylene oxide with 1 mole of a $C_{12}$–$C_{13}$ fatty alcohol are added dropwise over 30 minutes, the temperature rising to 80° C. The temperature is raised to 90° C. over 20 minutes and the reaction mixture is stirred for 1½ hours at this temperature. The reaction product is then cooled to room temperature. Yield: 228 g of the maleic acid hemiester of formula

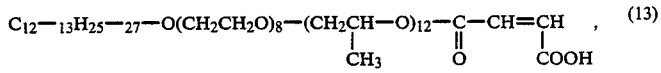

The acid number is 41.4.

195 g of the above maleic acid hemiester are mixed with 187.2 g of a 40% aqueous solution of sodium bisulfite and the mixture is stirred for 6 hours at 95° C. Upon cooling, tow phases form and the excess sodium bisulfite solution (inorganic phase) is separated. The residue is evaporated to dryness, affording 200 g of a viscous sulfosuccinate of the formula

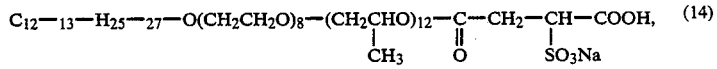

which is diluted with water to give a 50% solution with a pH of 5.5.

D. 1142 g of the adduct of 7 moles of ethylene oxide and 6 moles of propylene oxide with 1 mole of a $C_9$–$C_{11}$ alcohol are cooled to 12° C. under nitrogen. Then 163.1 g of chlorosulfonic acid are added from a micrometering device over 5½ hours while keeping the temperature at 15° C. by cooling with ice and removing hydrogen chloride gas. When the addition of chlorosulfonic acid is complete, the reaction mixture is stirred for 1¼ hours under a water jet vacuum (13 mm/Hg) at 16°-17° C. Yield: 1290 g of a clear yellowish product which is converted with aqueous sodium hydroxide solution into the sodium salt of the formula

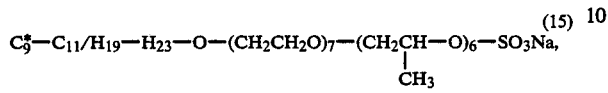
(15)

The following sodium salts of formulae (16), (17), (18) and (19) are prepared in the same manner as described in Example D using the appropriate starting materials:

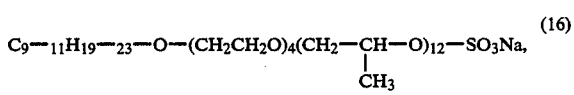
(16)

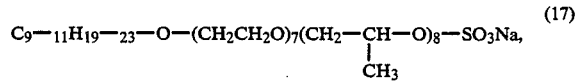
(17)

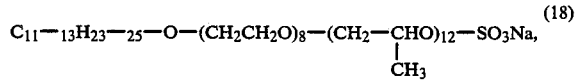
(18)

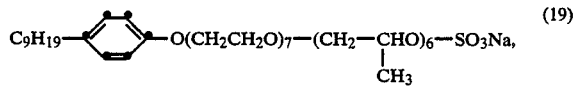
(19)

E. 86 g of phosphorus pentoxide are added, in portions, over 30 minutes to 219.4 g of an adduct of 1 mole of a C$_9$-C$_{11}$alcohol with 8 moles of ethylene oxide and 12 moles of propylene oxide. The reaction mixture is then heated to 50° C. and kept at this temperature for 4 hours. The reaction mixture is then filtered through a gauze filter, affording 227 g of a mixture of phosphoric acid mono- and diesters of the formulae

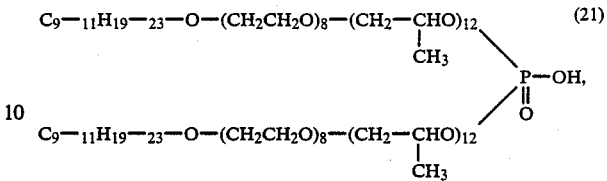

in the ratio 1:2.

USE EXAMPLES

Example 1

Untreated cotton knitted fabric with a weight per unit area of 165 g/m² is padded at 25° C. with an aqueous liquor which contains 50 g/l of the dye of formula

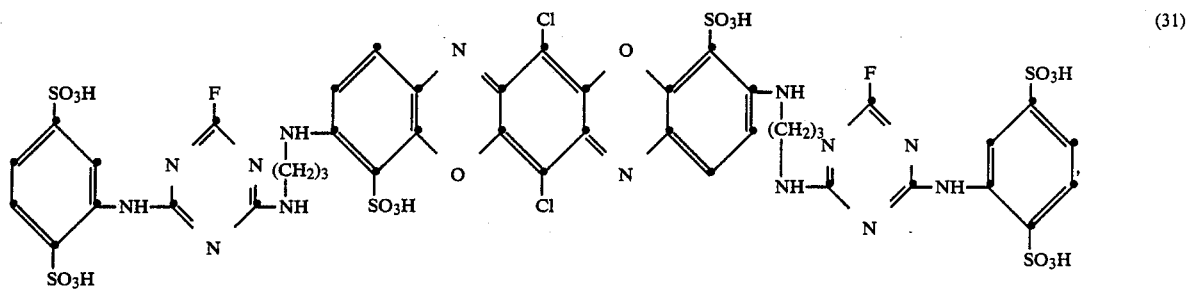
(31)

5 g/l of a 4:1 mixture of the sodium salt of the maleic acid hemiester of formula (11) and the sodium salt of the sulfated polyadduct of formula (15),
5 g/l of sodium m-nitrobenzenesulfonate,
5 g/l of the graft polymer prepared in Example 2 of EP-A-111454,
100 g/l of urea and
20 g/l of sodium carbonate.

No troublesome foaming occurs. The pick-up is 110%. The goods are then folded flat in a container, packed airtight and stored for 6 hours at room temperature. The fabric is then rinsed and washed for 10 minutes at the boil with a detergent (0.5 g/l of the adduct of 9 moles of ethylene oxide and 1 mole of nonylphenol). The goods are subsequently rinsed once more and dried. A level, strong, blue dyeing is obtained.

Example 2

Cotton fabric is padded with an aqueous liquor which contains 50 g/l of the dye of formula

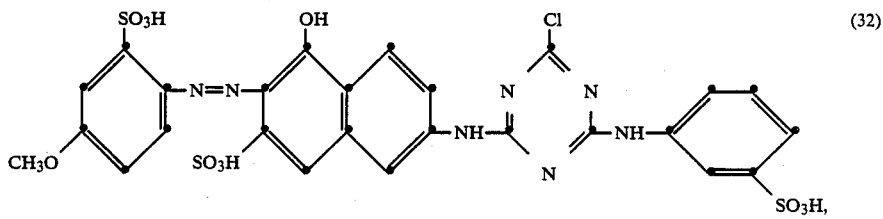
(32)

7 g/l of a 4:1 mixture of the sodium salt of the maleic acid hemiester of formula (11) and the sodium salt of the sulfated polyadduct of formula (15), 90 ml/l of 30% sodium hydroxide solution, and
100 ml/l of sodium silicate solution.

No troublesome foaming occurs. The pick-up is 80%. The fabric is then steamed for 90 seconds at 102° C., rinsed, washed at the boil, rinsed once more and dried. A strong, level, red dyeing is obtained.

Example 3

A polypropylene backed polyamide 66 carpet is padded with an aqueous liquor which contains
10 g/l of the yellow dye of formula

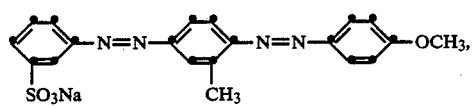

1.8 g/l of the red dye of formula

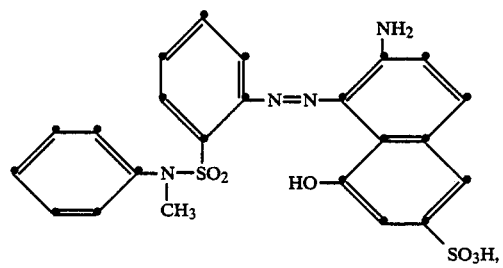

0.7 g/l of the blue dye of formula

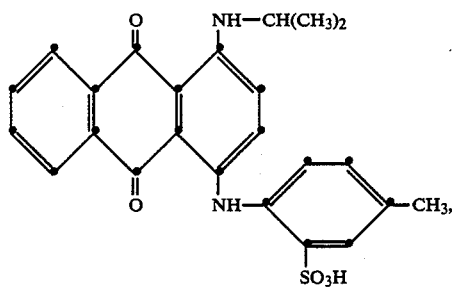

3 g/l of a 4:1 mixture of the sodium salt of the maleic acid hemiester of formula (11) and the sodium salt of the sulfated polyadduct of formula (15),
3 g/l of a 1:1 mixture of the di-(β-hydroxyethyl)amine salt of the sulfated polyadduct of 3 moles of ethylene oxide with 1 mole of lauryl alcohol and coconut fatty acid N-di-β-hydroxyethylamide, and
1 g/l of a thickener, e.g. carob seed gum ether.

No troublesome foaming occurs. The pick-up is 300%. The carpet is then steamed for 10 minutes at 102° C., rinsed, and dried. A strong, level, olive dyeing is obtained.

Example 4

A polyester/cotton blend (67/33) is padded with an aqueous liquor containing
30 g/l of a mixture of 40 parts of a dye of formula

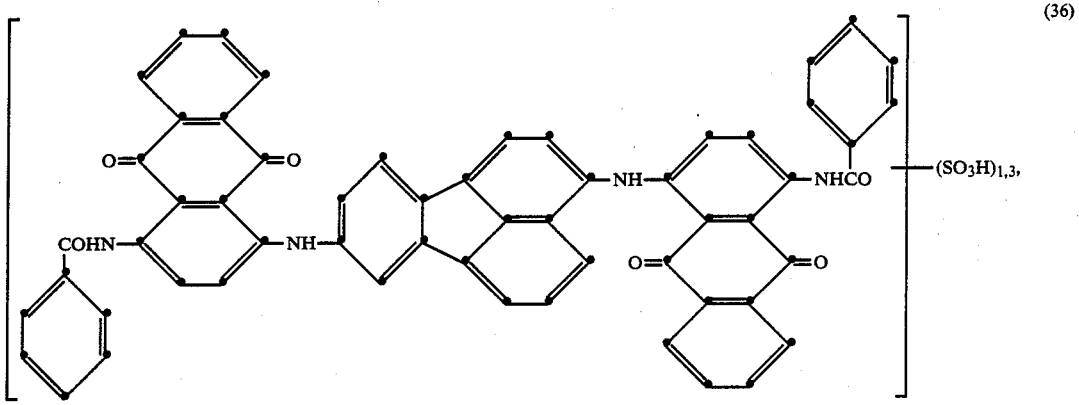

14 parts of a dye of formula

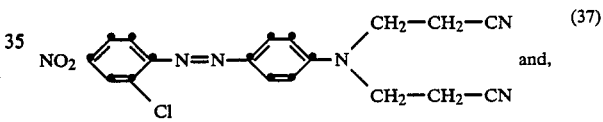

12 parts of a dye of formula

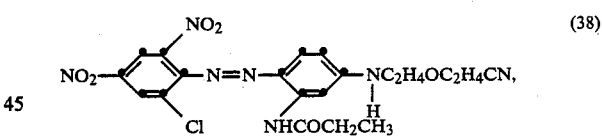

3 g/l of a 4:1 mixture of the sodium salt of the maleic acid hemiester of formula (11) and the sodium salt of the sulfated polyadduct of formula (15), and
3 g/l of an alginate thickener.

No troublesome foaming occurs. The fabric is then dried for 2 minutes at 120° C. and subjected to a thermosol fixation for 40 seconds at 220° C. The goods are then padded at room temperature with a liquor which contains
80 g/l of a 30% aqueous sodium hydroxide solution,
60 g/l of sodium hydrosulfite, and
10 g/l of sodium chloride.

The pick-up is 70%. The goods are then steamed at 102° C., rinsed, oxidised with 5 ml of 30 vol.% hydrogen peroxide at 40° C., and subsequently rinsed, soaped, rinsed once more and dried. A level dyeing is obtained.

Example 5

Polyester fabric is padded with an aqueous liquor which contains
20 g/l of the dye of formula

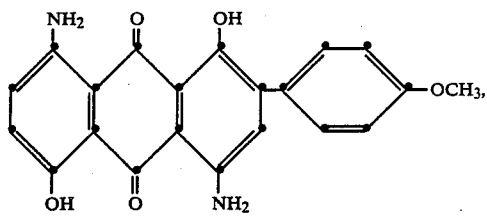

(39)

2 g/l of sodium alginate, and
3 g/l of a 4:1 mixture of the sodium salt of the maleic acid heimiester of formula (11) and the mixture of phosphoric acid esters prepared in Example E, No troublesome foaming occurs. The pick-up is 70%. The fabric is then dried for 3 minutes at 130° C. and subjected to a thermosol fixation for 20 seconds at 200° C. The goods are then washed warm and cold and dried. A level, fast, blue dyeing is obtained.

Example 6

Cotton fabric is padded at 60° C. with an aqueous liquor which contains
30 g/l of the dye, Direct Red 80 C.I. 35780,
2 g/l of a 9:1 mixture of the sodium salt of the sulfosuccinic acid hemiester of formula (12) and the sodium salt of the sulfated polyadduct of formula (15),
100 g/l of urea and
2 g/l of sodium aliginate.

No troublesome foaming occurs. The pick-up is 80%. The goods are then rinsed warm and cold and given an aftertreatment with a cationic fixing agent in a fresh bath, at a liquor to goods ratio of 1:40, on a winch beck for 20 minutes at 40° C. and pH 6. A level, fast, red dyeing is obtained.

Example 7

Untreated cotton fabric is washed at pH 10 (adjusted with sodium carbonate) in a hank washing machine for 30 minutes at the boil in a liquor to goods ratio of 1:30 with 5 g/l of a 4:1 mixture of the sodium salt of the maleic acid hemiester of formula (11) and the sodium salt of the sulfated polyadduct of formula (15). No troublesome foaming occurs during the treatment. The goods are then rinsed warm and cold and dried.

A drop test is then carried out to determine the detergent action. For comparison purposes, the test is carried out with fabric that has been treated in the same manner but without the addition of the composition of the invention.

Wetting effect in the drop test:
untreated fabric >5 minutes
treated only with water >5 minutes
treated with the composition
of the invention immediate wetting In addition, the treatment with the composition of the invention effects an appreciable brightening of the natural colour of the fabric.

What is claimed is:

1. A composition which comprises a mixture of which at least one component is an acid ester of the formula

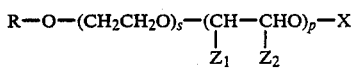

wherein
s is 3 to 10, p is 5 to 15,
R is an aliphatic radical of an unsaturated or saturated monoalcohol containing 6 to 24 carbon atoms;
one of $Z_1$ and $Z_2$ is methyl and the other is hydrogen, and
X is the acid radical of a low molecular aliphatic dicarboxylic acid, and
at least one other component of which composition is an acid ester of the formula:

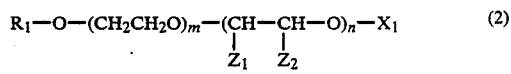

wherein
m is 3 to 10, n is 5 to 15,
$R_1$ is an aliphatic radical of not less than 6 carbon atoms or is alkylphenyl containing 4 to 16 carbon atoms in the alkyl moiety;
one of $Z_1$ and $Z_2$ is methyl and the other is hydrogen, and
$X_1$ is the acid radical of an inorganic oxygen-containing acid.

2. A composition according to claim 1, wherein $X_1$ is the sulfuric acid radical.

3. A composition according to claim 1, wherein $R_1$ and $R_2$ are each independently of the other a $C_8$-$C_{18}$alkyl or $C_8$-$C_{18}$alkenyl radical.

4. A composition according to claim 1, wherein the acid esters of formulae (1) and (2) are derived from fatty alcohol mixed ethers, wherein the ether moiety consists of 20 to 55 percent by weight of ethylene oxide units and 45 to 80 percent by weight o propylene oxide units.

5. A composition according to claim 1, wherein s is 4 to 8, p is 10 to 15, m is 4 to 8 and n is 6 to 12.

6. A composition according to claim 1, wherein the acid ester of formula (2) is the acid ester of formula

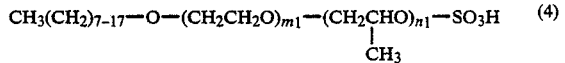

wherein
$m_1$ is 4 to 8 and
$n_1$ is 6 to 12.

7. A composition according to claim 1, which contains the acid esters of formulae (1) and (2) in the weight ratio of 9:1 to 1:1.

8. A composition according to claim 1 wherein X is the acid radical of maleic acid.

9. A composition according to claim 1 wherein X is the acid radical of sulfosuccinic acid.

10. A composition according to claim 1 wherein X is the acid radical of succinic acid.

11. A composition according to claim 8 wherein R is a radical containing 7 to 18 carbon atoms, s is 4 to 8, and p is 10 to 15.

12. A composition according to claim 9 wherein R is a radical containing 7 to 18 carbon atoms, s is 4 to 8, and p is 10 to 15.

13. A composition according to claim 10 wherein R is a radical containing 7 to 18 carbon atoms, s is 4 to 8, and p is 10 to 15.

* * * * *